United States Patent [19]

Schmidt

[11] Patent Number: 4,526,253

[45] Date of Patent: Jul. 2, 1985

[54] BRAKE FOR ROLLABLE RECEIVING ELEMENTS UTILIZED PARTICULARLY IN AIRPLANES

[75] Inventor: Hubert Schmidt, Camberg, Fed. Rep. of Germany

[73] Assignee: Lermer Apparatebau GmbH, Wiesbaden, Fed. Rep. of Germany

[21] Appl. No.: 446,070

[22] Filed: Dec. 2, 1982

[51] Int. Cl.³ .............................................. B60B 33/00
[52] U.S. Cl. .................................. 188/1.12; 16/35 R; 74/99 A; 74/478.5; 74/512; 188/21; 188/29; 188/74; 192/93 A
[58] Field of Search ..................... 188/1.12, 20, 21, 29, 188/74, 31, 5; 16/35 R; 192/93 R, 93 A, 99 S; 74/512, 478, 478.5, 99 A

[56] References Cited

U.S. PATENT DOCUMENTS

| | | | |
|---|---|---|---|
| 2,474,804 | 6/1949 | Schwarzbaum | 188/20 |
| 2,684,734 | 7/1954 | Wilson | 16/35 R |
| 2,685,351 | 8/1954 | Kramcsak, Jr. | 16/35 R |
| 2,864,465 | 12/1958 | Welsh et al. | 188/20 |
| 3,061,049 | 10/1962 | Bramley | 188/29 X |
| 3,313,377 | 4/1967 | Aninger | 188/5 |
| 3,710,895 | 1/1973 | Freedman | 188/5 |
| 4,152,951 | 5/1979 | Korczykowski | 74/512 X |
| 4,248,445 | 2/1981 | Vassar | 16/35 R X |
| 4,276,962 | 7/1981 | Aulik | 188/29 X |
| 4,360,951 | 11/1982 | Bucher | 188/29 X |

FOREIGN PATENT DOCUMENTS

| | | | |
|---|---|---|---|
| 1198211 | 8/1965 | Fed. Rep. of Germany | 188/1.12 |
| 2002978 | 7/1971 | Fed. Rep. of Germany | 188/1.12 |
| 2239339 | 3/1973 | Fed. Rep. of Germany | 16/35 R |
| 1753820 | 2/1974 | Fed. Rep. of Germany | 16/35 R |
| 2508950 | 3/1978 | Fed. Rep. of Germany | |
| 2506955 | 12/1978 | Fed. Rep. of Germany | |
| 1308774 | 3/1973 | United Kingdom | 16/35 R |
| 1338643 | 11/1973 | United Kingdom | 188/29 |

Primary Examiner—George E. A. Halvosa
Attorney, Agent, or Firm—Ernest F. Marmorek

[57] ABSTRACT

A braking arrangement adapted for use in connection with a rollable cart employed in commercial airplanes includes a longitudinal base plate, which has relatively narrow end portions of a predetermined with, and two roller pairs mounted on the base plate. At least one brake mechanism is mounted on the base plate, and acts on a corresponding roller pair. The brake mechanism includes a brake rod in parallel with an axle of the roller pair, a mounting plate for the brake rod located between the rollers, which has a recess on its lower side, and a rotary disc mounted within the recess of the mounting plate, which, in turn, has a downwardly projecting portion provided with two entrainment lugs. A guide for the brake rod is mounted on the mounting plate for restraining lateral movement of the brake rod, while permitting a movement of it along a substantially vertical direction. A brake pedal is connected to one entrainment lug downwardly actuatable within the width of one end portion of the base plate, and a brake-release pedal connected to the other entrainment lug is downwardly actuatable within the width of the other end portion of the base plate independently of the brake pedal.

11 Claims, 9 Drawing Figures

BRAKE FOR ROLLABLE RECEIVING ELEMENTS UTILIZED PARTICULARLY IN AIRPLANES

The invention relates to a brake for rollable receiving elements utilized particularly in airplanes, in the case of which brake, two coaxially arranged roller pairs are provided on the bottom sheet metal piece forming the base plate of the receiving element, and in the case of which brake, one braking rod is assigned to at least one of the two roller pairs, which brake rod extends over the rollers of said roller pairs and can be manipulated by means of a pedal or lever.

Through the DE-PS No. 25 06 955, a brake of this type destined for receiving elements became known, which brake, in addition to the interlocking possibility with an anchorage point arranged on the roller bed area, makes possible a cessation of movement through the intervention of upwardly moving tilting-brake-spikes or brake shoes and through the cancellation, associated therewith, of the rolling friction between the roller bed area and the receiving element.

A practically similar concept is represented by the U.S. Pat. No. 3,710,895.

However, these relatively complicated devices will not be addressed within the framework of the present invention since, independent on the required technical resources, the abrupt braking process manifesting itself in the case of this form of execution as a result of the upwardly moving braking spikes, can considerably influence the retainment of the prearranged storage of the receiving element's content—in particular when liquids are involved.

The interlocking mechanism of the receiving element provided at the bottom section of the same and cited additionally in this written document, is not an imperative requirement for the intended purpose.

It is for this reason, that the invention relates to a braking device which directly brakes or blocks the rotary motion of the rollers, whereby the concept of "blocking" has to be viewed as the termination of a braking process, which is carried out in a non-positive-locking manner generally associated with a decrease in kinetic energy, and is not to be viewed as a positive-locking process.

A relatively simple device for the (non-positive) blocking of the travelling rollers of service carts for commercial air liners is known from the DE-AS No. 25 08 950, which device is provided with a foot lever, in turn, arranged underneath one of the two front sides of the service cart or, alternately, underneath both two front sides of the service cart, and is provided with a blocking-rod which extends essentially in parallel manner to the bottom edge of the front side of the cart and extends over the travelling rollers.

The criterion of this protection request in essence consists in the following, namely in that below one or both front sides of the frame-work of the cart, a holding element is affixed, the side sections of which include vertically extending oblong holes in which the blocking rod is mounted, and in that furthermore a foot lever is attached in the holding device, which foot lever is in direct contact with the blocking rod and while pressing the blocking rod in downward direction, drives the same downwardly in opposition to a spring tension.

Thereby, the single or double travelling roller pairs which, in each case are arranged in coaxial manner, are either braked directly or through the interposition of intermediate members and are blocked for as long a time period until the load is removed from the foot lever.

Through a further development provisions are made that in the holding element a pressure plate, made of a synthetic material, is arranged, which makes possible the engagement or the affixation of the foot lever in its blocking position within a stopping point.

What is disadvantageous in the case of this form of execution is the fact that the possibility is not given of braking or blocking all four rollers simultaneously and selectively from the one or the other front side of the receiving element here in question.

Beyond this, the procedure recommended for the cancellation of the blocking, namely of lifting the braking lever by means of the point of the toe, must be viewed as a considerable disadvantage, since as a rule these brakes are operated by ladies.

At the least it can be said that it certainly does not help the preservation of a lady's shoe when, during the lifting operations of the stopping elements, operations which have to be undertaken at each row of seats of a commercial air liner during meal times, the upper leather of the shoe has to be subjected in each case to stresses and strains within the area of the tip of the shoe.

By starting with the first cited printed document, it is therefore the task of the present invention to devise a simple, especially effective brake according to the initially described type, whereby the brake's locked stopping position for both roller pairs can be set without any additional effort and whereby the unlocking operation is possible in a proper manner, that is to say in the same sense of direction as the setting for the braking process.

In the case of a generic type brake, the solution in accordance with the invention, of the task here in question, involves the combination of the following individual characteristics, namely:

(a) in that during the construction of the brake, a bearing flange is provided in each case for both steering roller pairs, which bearing flange is arranged at the bottom sheet metal piece between the steering roller pair located in each case on one shaft, in which bearing flange a rotary disc equipped with two entrainment lugs is concentrically housed in each case within a recessed area, and wherein the portion of said rotary disc which emerges from the bearing flange, is designed as a ring-shaped rotating track with indentations which are bordered by connecting flanks and adjoining slanting abutting surfaces;

(b) in that as it concerns a steering roller pair, the first and second entrainment lugs can be actuated independently along a traversing shaft, in the case of the first entrainment lug through the intervention of a tie rod and a lever section, by means of a brake pedal lever which is borne by the bracket arranged in front of the bearing flange, and in the case of the second entrainment lug by means of the unlocking lever borne by the same bracket;

(c) in that the braking- or the unlocking lever is in operative connection with a cranked brake rod which extends parallel to the shaft of a steering roller pair, which braking rod is concentrically guided in the slits of a bearing flange, is vertically adjustable through the rotation of the rotary disc, whereby its two extremities which are resiliently supported in the direction toward the bottom sheet metal piece, in each case act on one braking element;

(d) in that, after each actuation, each unlocking lever which is in operative connection with the entrainment lugs, can be automatically returned to its initial position through a torsion spring in conjunction with a stopping element arranged in the bracket.

The main portion of the brake consists of the form of construction, in accordance with the invention, of the bearing flange which in each case is equipped with slits for the guidance of a cranked brake rod and is destined for the up-take of a rotary disc which becomes converted to a rotary track, furthermore consists of the laterally emerging entrainment lugs and of the arrangement of delineated indentations in the rotary track, which to one side display connecting flanks with adjoining slanted abutting surfaces.

Through the intervention of the entrainment lugs which are connected with the rotary disc, the flat bearing flange taking up the rotary disc makes possible a direct guidance of the tie rods between two opposite lying corresponding brake arrangements on the bottom sheet metal piece, so that an optimum degree of guidance assurance is given for these components which are only subject to tensile stresses.

The braking rod's high position, which extends over a wide area of the circumference of the rotary track, makes it possible for the brake rod to securely remain in the braking position, without the necessity of arranging special stopping places in it.

The brake can be unlocked only through rotation of the rotary track, that is to say by stepping down onto the releasing pedal. The same secured position is given when setting the low position of the brake rod, that is to say in released or unlocked position of the brake.

In both cases, all that is required is to step down on one or the other pedal, so that no pedal will have to be lifted any longer with the tips of shoes.

The construction of the brake as four-roller brake or as four-wheel brake, merely requires the connection of the entrainment lugs by means of tie rods or the like.

Beyond that, this form of construction which, also in the case of a double-brake construction, eliminates the brackets or superstructural elements in the central region of the receiving element, offers a very extensive clearance of the bottom section, so that this form of construction is practically unlimited in its manipulation ability.

It is furthermore of advantage that the unlocking lever can be automatically returned to its starting position after each manipulation, namely through the intervention of a torsion spring in connection with a stopping element arranged in the bracket.

For the reduction of the friction of the rotary disc arranged within the bearing flange and the bottom sheet metal piece, it is proposed that, when inserted within the bearing flange, the rotary disc's bottom surface pointing in the direction toward the bottom sheet metal piece, include a dimension reduced by 0.2 to 0.5 mm in comparison to the thickness dimension of the bearing flange and that in the center of the rotary disc which is spatially limited by said bottom surface, a cylindrical or hemispherical recessed area is provided which is directed toward the bottom sheet metal piece, whereby the height of emergence of a ball-shaped element from the recessed area, corresponds to the thickness of the bearing flange or to the course of the bottom sheet metal piece.

In the interest of controlling wear and tear and of providing a simple maintenance procedure, provisions are made that the ring-shaped surface of the rotary track of the rotary disc is covered by a wearing disc, which is exchangeable, takes into consideration the depression of the ring-shaped surface of the rotary track, consists generally of a noble metal and corresponds exactly with the annular shape of the rotary track.

A specially favorable design of the wearing disc is given when the latter extends on both sides by means of a cross-piece over the cylindrical portion of the rotary track of the rotary disc.

During the selection of an appropriate fit, it suffices that the wearing disc, without additional affixation of the rotary track's ring-shaped surface, is merely mounted on the same.

The travelling conditions for the tie rods are essentially determined by the following, namely in that the angular freedom of the entrainment lugs determined by the recessed areas in the bearing flange, is set to about 30°, and in that the indentations in the rotary track of the rotary disc, start at an angle of about 45° with respect to the connecting line of the entrainment lugs and extend over a sector angle of about 60°.

For the direct construction of the brake, it is furthermore proposed that the thrust pin, which bears the braking element and is arranged within the structural component bearing the rollers, include a collar at its extremity facing the bottom sheet metal piece, against which collar a compression spring comes to lie, which is arranged between the same and the affixation flange of the structural component bearing the rollers.

In the interest of the elimination of a high type of construction or of a thick affixation flange for the structural component bearing the rollers, it is proposed that the bottom sheet metal piece and/or the affixation flange of the structural component bearing the rollers, include in each case an indentation for at least the partial up-take of the thickness of one extremity of the brake rod.

In this connection, it is recommended to flatten down the brake rod at its two extremities.

For the purpose of a modification of the brake, it is proposed that only one steering roller pair is provided with a brake mechanism. This applies in particular to relatively short receiving elements.

The brake designed according to the invention will be described in more detail by means of the graphic illustration of an exemplified embodiment.

Two coaxially arranged steering roller pairs 3 and 3' are connected in a conventional manner with the bottom sheet metal piece 2 of the receiving element 1, that is to say in pairs pointing to one front side of the receiving element, so that through the affixation flange 4/4' of each steering roller and through the structural element bearing the rollers 5/5' adjoining said affixation flange 4/4' a thrust pin 6, which is borne in axial direction by a compression spring 8, is guided in a stress-relieved state in the direction of the bottom sheet metal piece 2.

Figure 7:
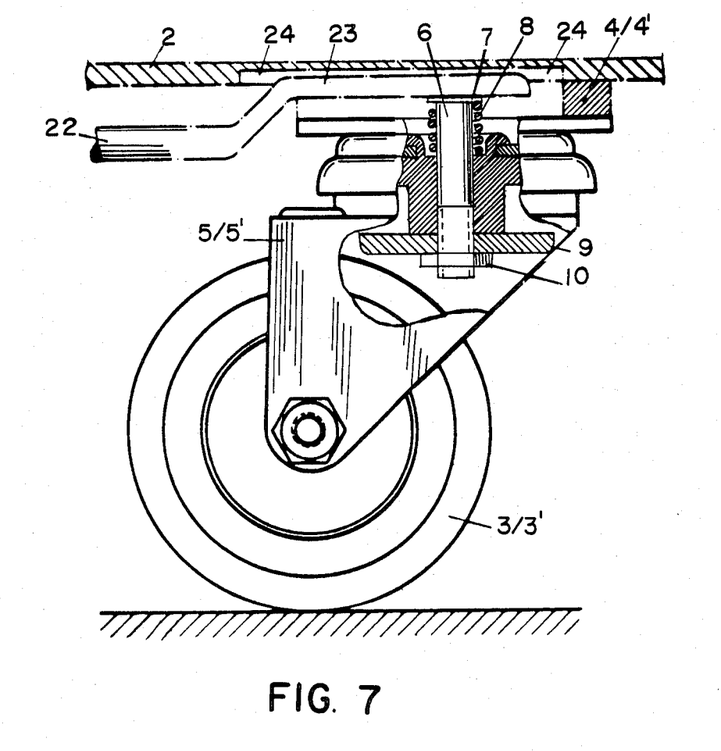
FIG. 7 shows a roller with the arrangement of the brake element in in connection with the bottom.

The compression spring 8 is arranged between the bearing structure 8 and the collar 7 which upwardly delineates the thrust pin 6. The area of thrust pin 6, which leads in the direction toward the rollers and is provided with a thread, is the carrier of a brake element 9 which is adjustable, for example by means of a nut combination 10; in the case of this example, the brake element is a circular brake disc.

Between the affixation flanges 4 and 4' of the steering roller pairs 3 and 3', a bearing flange 11/11' which is connected with the bottom sheet metal piece, is arranged in concentrical manner for the guidance of a rotary disc 12/12' which can be pivoted in parallel manner to the bottom sheet metal piece 2.

In addition to a cylindrical pass-through element 13 destined for the passage of the rotary disc 12/12' which is converted to a rotary track, the bearing flange 11/11' includes two opposite lying recessed areas 14 which have the same opening width. These recessed areas are provided for the pivotable lateral passage of one each of the entrainment lugs 15/15' which, via removable pins 38/38', are connected with the rotary disc 12/12', so that the latter slide practically directly above the bottom sheet metal piece 2 and so that, the angular freedom created by the recessed areas for the entrainment lugs 15/15'—namely in transverse direction to the longitudinal axis of the receiving element—amounts to a total of 30° on each side.

In its surface area 17 which extends in parallel manner to the base surface 16 of the rotary disc 12/12', the rotary disc's 12/12' rotary track includes two indentations 18 which are arranged opposite one another at a 45° angle with respect to the position of the entrainment lugs 15/15', which indentations extend over a sector angle of 60° in each case and are delineated by the connecting flanks 19.

Here two connecting flanks 19/19 which, in a displaced manner, lie opposite one another, are constructed in form of slanted abutting surfaces 19a/19a.

In order to reduce the sliding friction of the entrainment lugs 15/15' with respect to the bottom sheet metal piece 2, with the entrainment lugs 15/15' being guided within the bearing flange's 11/11' recessed areas 14 and forming a component of the bottom surface spatially limiting the rotary disc 12/12', provisions are made that the bottom surface or the entrainment lugs connected with the same, when inserted within the bearing flange 11/11', includes a dimension reduced by 0.2 to 0.5 mm in comparison to the thickness dimension of the bearing flange 11/11'.

In order to guard against excessive wear, and in order to facilitate maintenance, the ring-shaped surface area 17, of the rotary disk 12/12', can be covered with a removable, interchangeable wearing disk 12'' consisting of noble metals. For a better fit, the wearing disk is provided with overlapping sides 12'''.

Figure 8:
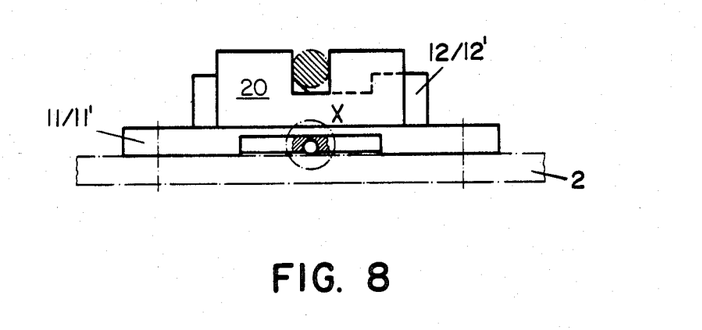
FIG. 8 shows an arrangement, with a low degree of friction, of the rotary disc within the bearing flange which is connected with the bottom sheet metal piece. View III in FIG. 5.
Figure 9:
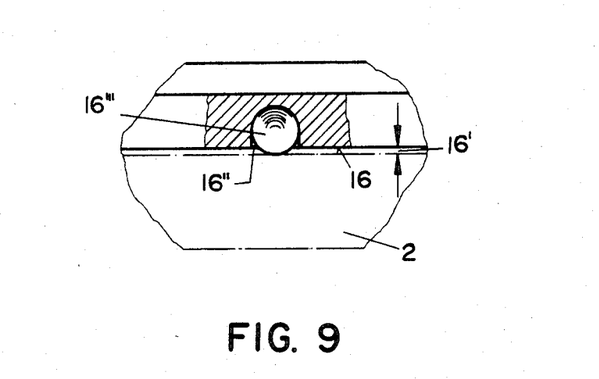
FIG. 9 shows a detail X from FIG. 8.

In the center of the rotary disc 12/12' which is spatially limited by the bottom surface, a hemispherical recessed area 16'' is provided, which is directed toward the bottom sheet metal piece, so that the depth of these recessed areas 14, in conjunction with the diameter of the ball-shaped element 16''', is adjusted in such a manner, so that the height of emergence of the ball-shaped element 16''' corresponds to the thickness of the bearing flange 11/11' or to the course of the bottom sheet metal piece, that is to say, the maximum height of the ball-shaped element, the bottom sheet metal piece 2 and the bearing flange 11/11' form a line.

Furthermore, the bearing flange 11/11', namely in longitudinal direction of the receiving element and laterally delineating the same, is connected with two cross-pieces 20 which point away from the bottom sheet metal piece 2. Each cross-piece is designed with an open slit 21, so that the slits 21, in combination with their position, represent the guidance for the brake rods 22/22', which extend in transversal direction over the center point of the rotary disc 12/12' toward the two thrust pins 6. The two extremities 23 of the cranked brake rod 22/22' are flattened and, between the affixation flanges 4 and 4' and the bottom sheet metal piece 2, extend through an indentation 24 which is arranged in the bottom sheet metal piece and, in each case, end on both sides of the collar 7 of the thrust pin 6.

The braking lever 27/27' and the unlocking lever 28/28' are borne by a U-shaped bracket (25) which is arranged at the bottom sheet metal piece 2 and pointing away from the same, namely in front of the bearing flange 11/11' in concentric manner with respect to the nearest lying front side of the receiving element, so that these pedal levers can be independently manipulated through the intervention of pivotable bearing sleeves 27a/27a' and 28a/28a' along a shaft 26/26' which extends through the bracket 25/25' in question.

Each pedal lever in essence consists of a pressure plate 29/29' or 30/30' and of lever sections 31/31' or 32/32' which, at a small distance from one another, are arranged in each case in a parallel manner on a pivotable bearing sleeve 27a/27a' or 28a/28a', which lever sections—starting from the arm of the lever which is stepped on—point with their traction extremity head in the direction of the bearing flange 11/11' namely at an angle of 120°.

Figure 1:
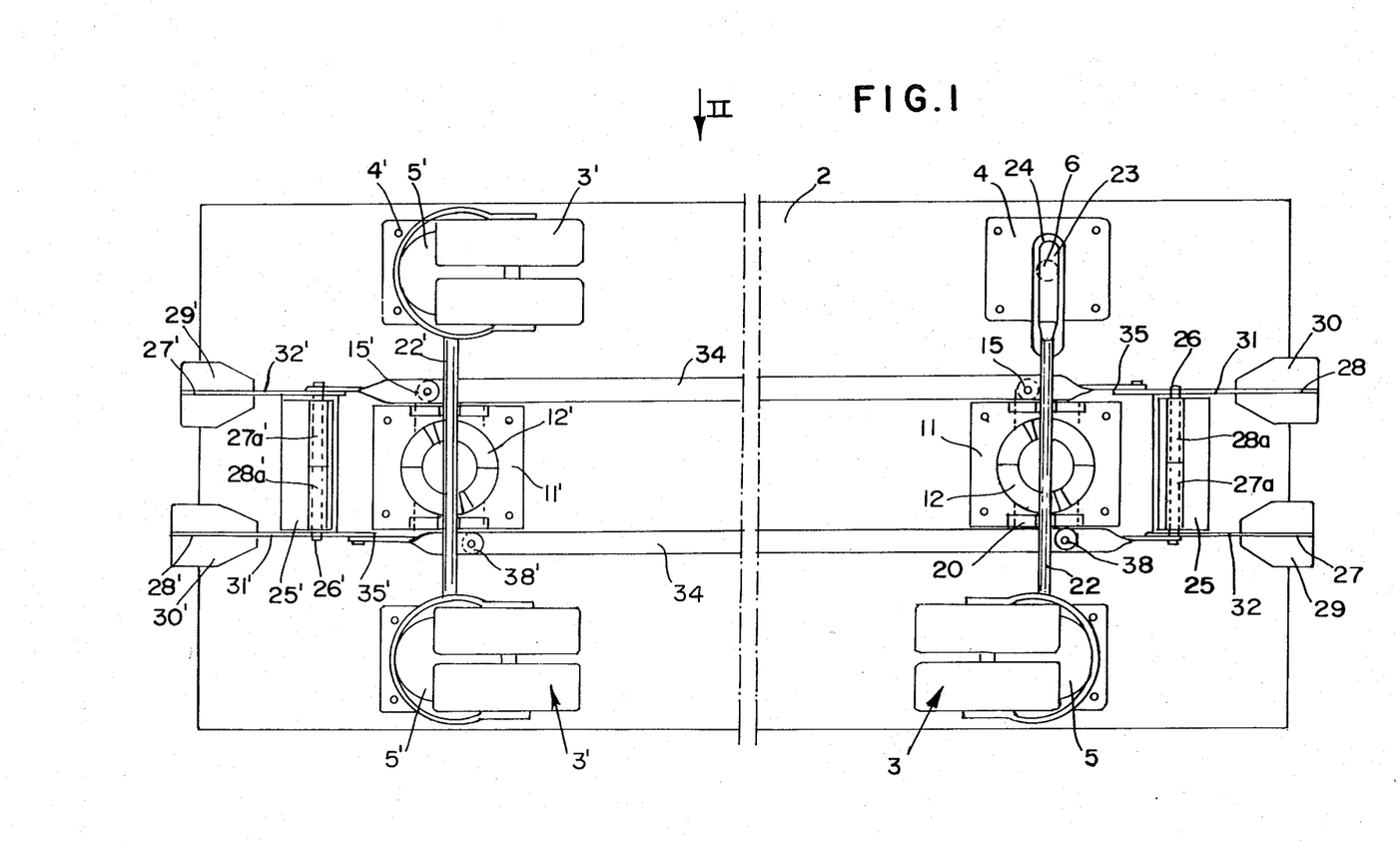
FIG. 1 shows the arrangement of the brake on the bottom section of the receiving element, namely in the direction of I in FIG. 2, with omission of one steering roller pair.
Figure 2:
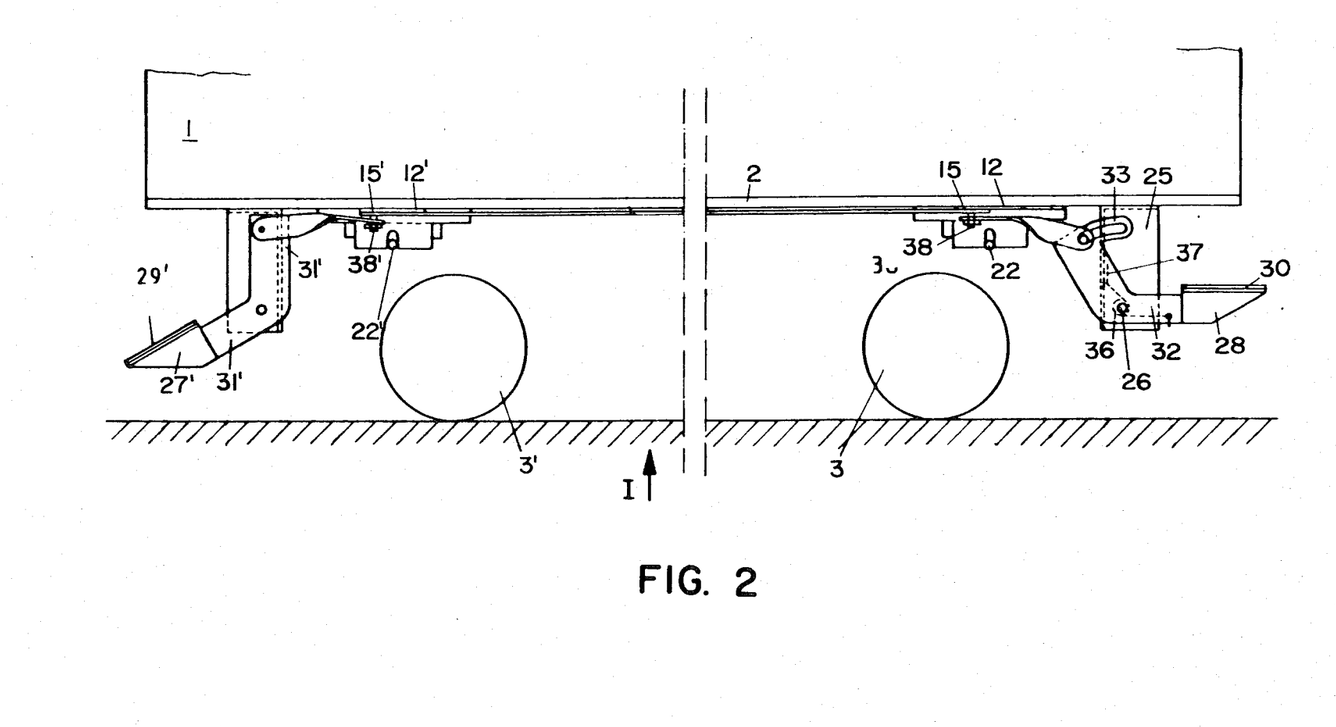
FIG. 2 shows the arrangement of the brake in front elevation, namely in the direction II in FIG. 1.
Figure 3:
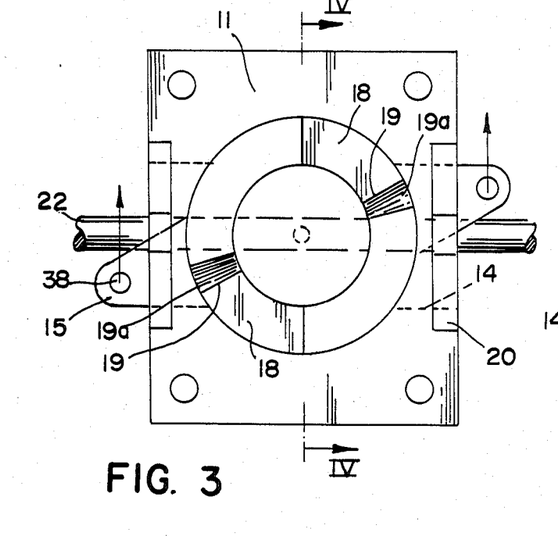
FIG. 3 shows the combination of bearing flange, rotary disc and rotary track in the case of an operatable brake.
Figure 4:
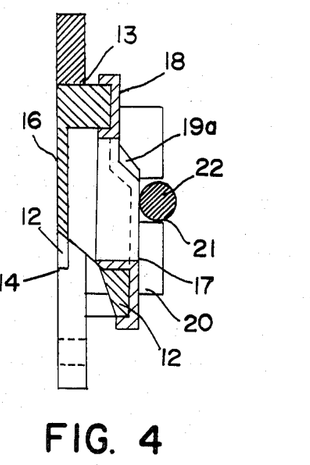
FIG. 4 shows the sectional view in accordance with IV—IV in FIG. 3.
Figure 5:
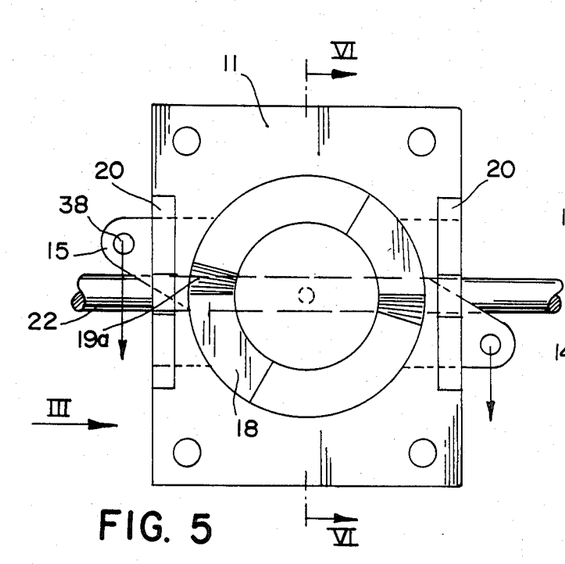
FIG. 5 shows the combination in accordance with FIG. 3, in the case of an unlocked brake.
Figure 6:
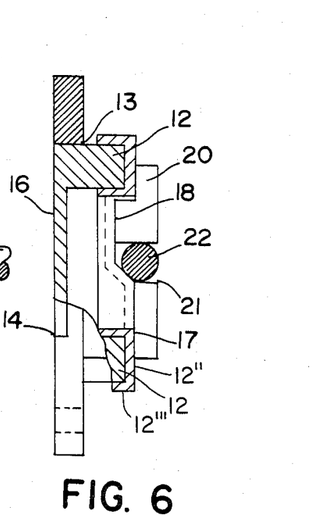
FIG. 6 shows the sectional view in accordance with VI—VI in FIG. 5.

At the lever sections 31/31' of the unlocking lever 28/28', curved slots 33 are provided opposite the tie rod extremity 35/35' (see FIG. 2) for the corresponding sliding guidance of the tie rod extremity 35/35', in which the tie rod 34, which points in the direction of the opposite lying entrainment lug 15/15', glides during the manipulation of the brake pedal 27/27', so that the normal position of the unlocking pedal 28/28' is not influenced by the braking process. The normal position is adjusted again after each manipulation of the unlocking pedal, namely by means of a torsion spring 36 in conjunction of an abuttment element 37 arranged in the bracket 25.

The tie rods 34/34 which lead to the entrainment lugs 15/15' are slanted steel strips which, in each case, lead with their extremities 35/35' to the lever sections 31 and to the lever sections 32 and are connected with the same in an articulate manner.

Starting from the entrainment lugs 15 with which they are connected in each case by means of a removable pin 38, the tie rods 34/34 which lie on the bottom sheet metal piece 2, after the cited slanting of the tie rod extremities 35/35′, lead to the corresponding device arranged on the opposite lying narrow side of the bottom sheet metal piece 2, that is to say they lead to the braking device's entrainment lugs 15′ with removable pin 38′, and furthermore lead to the braking device's pedal levers 27 and 27′, with which they are connected in the same described manner.

The brake-pedal-levers 27/27′ and the unlocking-pedal-levers 28/28′ are manipulated in similar arrangement from each front side of the receiving element, so that preferentially the braking side is selected to be the right one and the unlocking side as being the left one.

The tie rods 34/34 can be formed of course as a unit of one with the tie rod extremities 35 or 35′. In this case, the two extremities are merely slanted in the direction toward the entrainment lugs 15/15′ and are slightly bent in upward direction.

I claim:

1. A braking arrangement adapted for use in connection with a rollable cart employed in airplanes, particularly in commercial airplanes, comprising in combination a longitudinal base plate having relatively narrow end portions of a predetermined width, two roller pairs mounted near opposite respective end portions on said base plate, each roller pair having a common axle, said axles being similar to one another, at least one brake mechanism mounted on said base plate, and acting on a corresponding of said roller pairs, said brake mechanism including a brake rod extending over the roller pair associated therewith, and in parallel with the axle of said roller pair, mounting means for said brake rod secured to said base plate therebelow, being located between the rollers of said roller pair, and having a recess on a lower side thereof, a rotary disc mounted at least partly within the recess of, and concentrically with said mounting means, having a portion projecting downwardly from said mounting means, being provided with two entrainment lugs, and being movable between two extreme angular positions, guide means for said brake rod mounted on said mounting means for restraining and lateral movement of said brake rod, while permitting a movement thereof along a substantially vertical direction, said downwardly projecting portion having an outer surface and oppositely disposed radially extending longitudinal indentations, each bordering on one longitudinal side thereof an upright wall, and on the other side thereof a wall inclined with the vertical, each being angularly positioned so that in one angular extreme position of said rotary disc said brake rod rests on said inclined walls in a "brake released" state, while resting in the other angular position in a "brake actuated" state on said outer surface of said outwardly projecting portion, a brake pedal downwardly actuatable within the width of an end portion of said base plate, a first lever pivotable on a shaft extending substantially in parallel with said axle, said brake pedal being secured to said first lever, and being disposed in a bracket secured to said base plate near an outer end of said base plate, and farther outwardly than said mounting means, a first tie rod pivotably connecting said first lever to one entrainment lug, a brake-release pedal having an initial position and being downwardly actuatable within the width of said end portion of said base plate independently of said first lever, a second lever pivotable on said shaft, said brake-release pedal being secured to said second lever, a second tie rod pivotably connecting said second lever to the other entrainment lug, said tie rods being substantially stressable only in tension, whereby each lever is operatively in contact with said brake rod, said brake rod being formed as a crank rod near each outer end thereof, two adjustable brake elements operatively acting on said rollers of said roller pair, respectively, and in resilient operative contact with said ends of said brake rod, respectively, and a torsion spring mounted on said bracket, and being in operative connection with said brake-release pedal, so as to automatically enable said brake-release pedal to return to said initial position in cooperation with a stop mounted on said bracket, following each actuation of said brake-release pedal.

2. A braking arrangement as claimed in claim 1, further including a second brake mechanism acting on the other roller pair, and being similar to the first brake mechanism, said brake mechanisms being mounted near opposite end portions of said base plate.

3. A braking arrangement as claimed in claim 2, wherein said rotary disc has a base surface facing said mounting means, a central portion of said base surface defining a gap of a width from 0.2 to 0.5 mm with respect to an oppositely disposed surface of said mounting means, said base surface being formed with a second recess having a sphere nestled therein, said sphere being dimensioned to establish operative contact with said oppositely disposed surface of said mounting means.

4. A braking arrangement as claimed in claim 2, wherein said outer surface of the downwardly projecting portion of said rotary disc is formed as a replaceable wear-resistant disc having openings aligned with said indentations, respectively, and having a periphery corresponding exactly to the periphery of the remainder of said rotary disc.

5. A braking arrangement as claimed in claim 4, wherein said wear-resistant disc is made of noble steel.

6. A braking arrangement as claimed in claim 2, wherein said outer surface of the downwardly projecting portion of said rotary disc is formed as a wear-resistant disc having openings aligned with said indentations, respectively, and including a bar extending radially beyond the periphery of said rotary disc on opposite sides thereof.

7. A braking arrangement as claimed in claim 2, wherein said mounting means has a pair of oppositely disposed segmental grooves receiving said entrainment lugs, respectively, and being arranged to accommodate a pivoting range of said entrainment lugs extending over about 30°, and wherein said entrainment lugs are oppositely disposed and define a connecting line, each segmental groove starting about 45° from said connecting line, and extending over a centering angle of about 60°.

8. A braking arrangement as claimed in claim 2, further comprising a thrust pin adjustably carrying a corresponding one of said brake elements, and a roller support associated with each roller, a support plate connecting said roller support to said base plate, said thrust pin being arranged in said roller support, and including a collar near an end thereof facing said base plate, a compression spring being disposed between said collar and said corresponding one of said brake elements.

9. A braking arrangement as claimed in claim 2, further comprising a roller support, and a support plate connecting said roller support to said base plate, one of said plates being formed with a longitudinal groove for at least partially accommodating a corresponding outer end of said brake rod.

10. A braking arrangement as claimed in claim 9, wherein each outer end of said brake rod is flattened.

11. A braking arrangement as claimed in claim 2, wherein the first tie rod of the first brake mechanism is rigidly connected to the second tie rod of said second brake mechanism, and wherein the second tie rod of the first brake mechanism is rigidly connected to the first tie rod of the second brake mechanism, whereby any pedal actuated on one brake mechanism automatically also actuates the other brake mechanism.

* * * * *